(No Model.) 2 Sheets—Sheet 1.

G. BETTINI.
ACETYLENE GAS LAMP.

No. 589,404. Patented Sept. 7, 1897.

WITNESSES:

INVENTOR
Gianni Bettini
BY
Witter & Kenyon
his ATTORNEYS (No Model.) 2 Sheets—Sheet 2.
G. BETTINI.
ACETYLENE GAS LAMP.
No. 589,404. Patented Sept. 7, 1897.
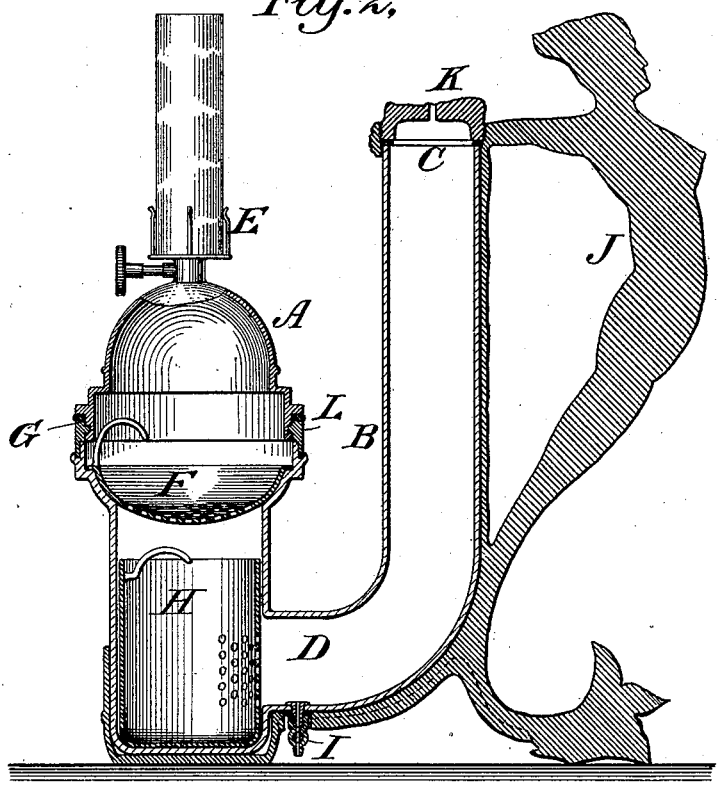
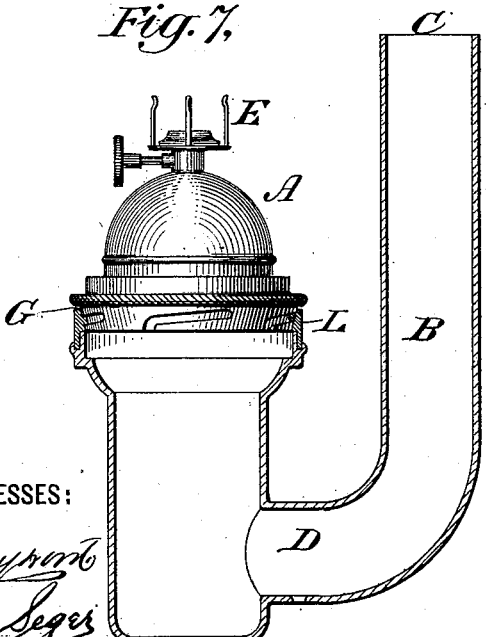
WITNESSES:
INVENTOR
Gianni Bettini
BY
Witter & Kenyon
his ATTORNEYS

UNITED STATES PATENT OFFICE.

GIANNI BETTINI, OF NEW YORK, N. Y.

ACETYLENE-GAS LAMP.

SPECIFICATION forming part of Letters Patent No. 589,404, dated September 7, 1897.

Application filed December 19, 1895. Serial No. 572,620. (No model.)

*To all whom it may concern:*

Be it known that I, GIANNI BETTINI, a subject of the King of Italy, and a resident of New York, in the county and State of New York, have invented a certain new and useful Improvement in Gas-Lamps, of which the following is a specification.

This invention relates to an improved gas-lamp in which the gas is generated or produced by the union of a solid and a liquid and the supply of gas and the pressure on the same is automatically regulated.

My invention is especially applicable to the producing and use of acetylene gas by the union of calcium or other metallic carbid and water.

The accompanying drawings represent a lamp which embodies my invention in its preferred form.

Figure 1:
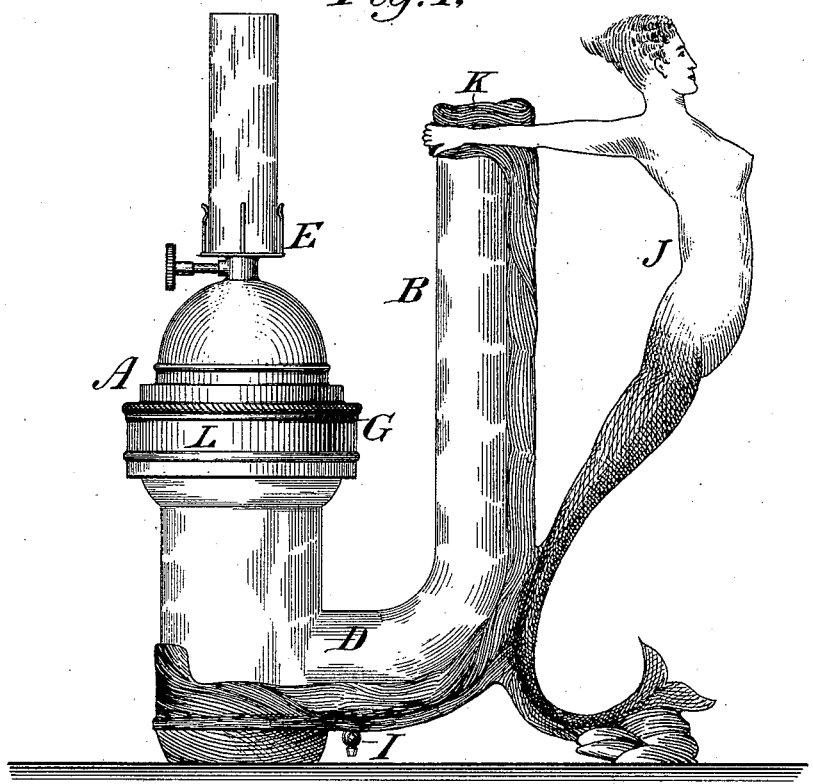
Figure 5:
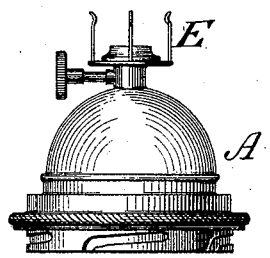

Figure 1 is a side view. Fig. 2 is a section. Figs. 3, 4, 5, and 6 are details. Fig. 7 shows a modification of one part.

A is the main body or bowl of the lamp.

B is a liquid-reservoir open at the top to the air, as at C, and connecting at the bottom with the lower part of the body of the lamp A, as by the horizontal channel D.

The lamp-body A has a suitable burner E, and at its upper portion constitutes a gas-reservoir. Beneath this gas-reservoir is the support F for holding the gas-generating solid. It is suitably perforated both to allow access of the liquid from below and also to permit the dropping through of the solid residue. This support F for holding the gas-generating solid is preferably removable, and to that end it may be loosely seated upon a shoulder in the walls of the lamp-body and be provided with a convenient handle, as shown. In such case the upper part of the lamp-body A is constructed so as to be capable of being opened, as at the gas-tight joint G. When the lamp-body is opened at this point, as by unscrewing the upper part from the lower part, the support F may be readily lifted out and as readily inserted after a new charge of the gas-generating solid has been placed upon it or within it.

In the lamp-body, below the position of the supporting cage or basket F, is the vessel H for catching and holding the solid residue resulting from the gas-generating operation of the liquid upon the solid in the support F. This solid residue falls through the perforations in the support F and is caught and held in the vessel H, which is preferably removable, as shown, and to that end is made separate from the lamp-body and to rest suitably within the same below the position of the support F, and is provided with a handle by which conveniently to lift it out when the lamp-body is unscrewed at G. The vessel H is preferably arranged, as shown, in the liquid way or conduit. In such case the solid residue of the gas-generating operation falls through the liquid into the vessel H, and such vessel is arranged so as not to close up said liquid way or conduit, as by means of the perforations in the side wall of the same and by the depressed seat of the vessel, as shown in the drawings. The liquid way or conduit has a cock I to draw off the liquid.

In use the lamp-body A is opened at the gas-tight joint G, the lower vessel H is put in place, and the upper support or vessel F, with the calcium carbid or other gas-generating solid properly arranged upon it, is introduced into the lamp-body and the upper part of the lamp-body is screwed on tight. The proper quantity of water or other suitable liquid is then poured into the top of the open upright liquid-reservoir or part B, the cock I being closed. This water or other liquid fills the lower part of the lamp and rises up into contact with the calcium carbid or other solid in the perforated support F. The gas is generated by such contact and fills the upper or gas-reservoir part of the lamp-body, the burner E being preferably left open a moment until the air is driven out by the gas, when the gas may be lighted at the burner. The generation of the gas and its accumulation in the gas-reservoir will tend to force the liquid down in the lamp-body A and up in the upright part B, partly reducing the extent of contact or wholly ending the contact between the solid upon the support F and the said liquid. As the gas is consumed, however, the pressure in the gas-reservoir diminishes and the water below the support F rises until it is again in contact with the solid, when the generation of the gas again begins. An automatic control of the generation of the gas and its amount is thus secured. Moreover, the pressure of the liquid column in the open upright part B is less when the amount of gas in the part A is small and requires replenishing, and that the pressure is greater when the amount of gas is greater and fresh generation of gas is less required, the pressures existing in the lamp thus also tending automatically to regulate the gas-generating functions.

The construction of the support F for holding the gas-generating solid should be such as to facilitate the contact of that solid with the liquid when such contact is required and to reliably get rid of the solid residue resulting from the chemical action involved, so as not to clog the apparatus at that point or prevent subsequent contact of the liquid with the as yet unaltered portions of the gas-generating solid.

The construction of the lower vessel H for holding the solid residue should be such as to reliably catch and hold that solid residue without interfering with the access or operation of the liquid to the gas-generating solid in the support F.

Figure 6:
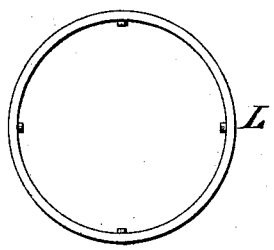

In the particular form of lamp shown in the drawings the parts are especially compact and convenient. A holder or handle J is provided, which may be of bronze or other metal and ornamental. It has a sufficiently broad base for safe support, is cup-shaped below to furnish a seat for the lamp, has a handle or bracket at the rear, and an upper supporting-arm or part. In this upper arm a cover K for the upright part B of the lamp screws, thereby at the same time covering such part of the lamp and locking the lamp fast down in its seat in the cup of the holder J. The cover has an air-hole, as shown. To remove the lamp from the holder, unscrew K, raise the lamp out of its seat, protruding B through the collar of the upper arm of the holder, and turn the lamp on the holder, when B can be slipped down out of such collar. To replace, reverse these steps. Two forms of gas-tight joints G are shown. In that shown in Figs. 2, 5, and 6 a brass collar L is cemented to the glass of the lower part of the lamp-body A, and has inwardly-projecting studs, as shown in Figs. 2 and 6, which take into inclined ways in the upper part of the lamp-body. (Shown in Fig. 5.) A suitable packing between the meeting edges will enable a gas-tight joint to be attained. In the form of joint shown in Fig. 7 the brass collar on the lower part of the lamp-body is conical, as is also the corresponding portion of the upper part, as shown.

What I claim as new, and desire to secure by Letters Patent, is—

1. In an acetylene-lamp the body A having burner E, gas-tight joint G, support F for the calcium carbid and vessel H for holding the solid residue, and the liquid-reservoir B, the latter connecting with the body A at a point above the bottom of the same and below the support F, substantially as set forth.

2. In an acetylene-lamp the body A having burner E, gas-tight joint G, support F for the calcium carbid and vessel H for holding the solid residue, and the liquid-reservoir B, the latter connecting with the body A at a point above the bottom of the same and below the support F and having a liquid-cock I, substantially as set forth.

3. In a lamp the combination with the main lamp-body A and upright part B connecting at the bottom, of the holder J having cup-shaped base, handle or bracket, and upper arm encircling the upright part B, substantially as set forth.

4. In a lamp the combination with the main lamp-body A and upright part B connecting at the bottom, of the holder J having cup-shaped base, handle or bracket, and upper arm encircling the upright part B and the locking-cover K, substantially as set forth.

In testimony whereof I have signed my name to this specification in the presence of two subscribing witnesses.

GIANNI BETTINI.

Witnesses:
J. CARTER BEARD,
EDWIN SEGER.